United States Patent
Kimura et al.

(10) Patent No.: US 12,084,078 B2
(45) Date of Patent: Sep. 10, 2024

(54) VEHICLE, DISPLAY METHOD, AND NON-TRANSITORY COMPUTER STORAGE MEDIUM

(71) Applicant: TOYOTA JIDOSHA KABUSHIKI KAISHA, Toyota (JP)

(72) Inventors: Koji Kimura, Nagoya (JP); Satoaki Takabatake, Nisshin (JP); Junji Miyazaki, Nagoya (JP); Yuki Yoshida, Toyota (JP); Ryo Ogata, Toyota (JP); Tadashi Morishita, Kariya (JP); Takamitsu Toyoura, Tokyo-to (JP); Atsuki Kinoshita, Mishima (JP); Yuki Mori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 17/360,352

(22) Filed: Jun. 28, 2021

(65) Prior Publication Data

US 2021/0403021 A1     Dec. 30, 2021

(30) Foreign Application Priority Data

Jun. 30, 2020   (JP) ................................ 2020-113223

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 30/08* (2013.01);
(Continued)

(58) Field of Classification Search
CPC ................. B60W 50/14; B60W 30/08; B60W 30/18163; B60W 60/0015;
(Continued)

(56) References Cited

U.S. PATENT DOCUMENTS

| 11,643,092 | B2 * | 5/2023 | Doemling ......... B60W 50/0097 |
| | | | 701/300 |
| 2015/0194055 | A1 * | 7/2015 | Maass ............. B60W 30/18163 |
| | | | 340/905 |
| 2016/0185388 | A1 * | 6/2016 | Sim ....................... B60W 10/04 |
| | | | 701/41 |
| 2016/0300491 | A1 | 10/2016 | Fukuda et al. |
| 2017/0349173 | A1 | 12/2017 | Nishiguchi et al. |
| 2019/0047561 | A1 | 2/2019 | Nishiguchi et al. |
| 2019/0071075 | A1 | 3/2019 | Mimura |
| 2019/0144004 | A1 | 5/2019 | Mimura et al. |

(Continued)

FOREIGN PATENT DOCUMENTS

| CN | 105765641 A | 7/2016 |
| CN | 109074740 A | 12/2018 |

(Continued)

*Primary Examiner* — Anshul Sood
*Assistant Examiner* — Micah Chuen-Him Cheng
(74) *Attorney, Agent, or Firm* — Sughrue Mion, PLLC

(57) ABSTRACT

A vehicle reducing unease of a driver during driver assistance, provided with a display device configured to display a surrounding vehicle together with a host vehicle at a relative position calculated by an object recognition device, display a mark showing that a lane change is planned to be performed at a predetermined space for performing a lane change in a destination driving lane which is a destination for a lane change when an automatic lane change is planned to be performed, and make a position of the mark change in accordance with the relative position of the surrounding vehicle when there is a surrounding vehicle present having an effect on a lane change in the destination driving lane.

5 Claims, 6 Drawing Sheets

(51) Int. Cl.
*B60K 35/29* (2024.01)
*B60W 30/08* (2012.01)
*B60W 30/18* (2012.01)
*B60W 60/00* (2020.01)
*G06V 20/58* (2022.01)

(52) U.S. Cl.
CPC .............. *B60W 30/18163* (2013.01); *B60W 60/0015* (2020.02); *G06V 20/584* (2022.01); *B60K 35/29* (2024.01); *B60K 2360/1868* (2024.01); *B60W 2050/146* (2013.01); *B60W 2554/801* (2020.02)

(58) Field of Classification Search
CPC ............ B60W 2050/146; B60K 35/00; B60K 2370/1868; G06V 20/584
See application file for complete search history.

(56) References Cited

U.S. PATENT DOCUMENTS

| | | | | |
|---|---|---|---|---|
| 2020/0094875 | A1* | 3/2020 | Mimura | B62D 15/0265 |
| 2020/0307594 | A1* | 10/2020 | Kato | G06V 20/588 |
| 2020/0384996 | A1* | 12/2020 | Mahajan | B60W 30/143 |

FOREIGN PATENT DOCUMENTS

| | | | | |
|---|---|---|---|---|
| CN | 109398359 A | | 3/2019 | |
| JP | 2007-304992 A | | 11/2007 | |
| JP | 2015101282 A | * | 6/2015 | ............... B60R 1/00 |
| JP | 2017-217969 A | | 12/2017 | |
| JP | 2019-036086 A | | 3/2019 | |
| JP | 2019-090627 A | | 6/2019 | |
| JP | 2019-137139 A | | 8/2019 | |
| WO | 2017/064798 A1 | | 4/2017 | |
| WO | 2017/158768 A1 | | 9/2017 | |

* cited by examiner

VEHICLE, DISPLAY METHOD, AND NON-TRANSITORY COMPUTER STORAGE MEDIUM

FIELD

The present disclosure relates to a vehicle, a display method, and a non-transitory computer storage medium.

BACKGROUND

Japanese Unexamined Patent Publication No. 2019-137139 discloses a vehicle which recognizes surrounding vehicles present around a host vehicle and automatically changes lanes.

SUMMARY

In the case of a vehicle able to automatically change lanes, if when that lane change will be made or, further, to what position of the driving lane to be changed to that lane change will be made is unknown, the driver is liable to feel uneasy.

The present disclosure was made focusing on such a problem and has as its object to enable a driver to easily obtain a grasp of when that lane change will be made or, further, to what position of the driving lane to be changed to that lane change will be made.

To solve that problem, according to one aspect of the present disclosure, the vehicle able to automatically change lanes is provided with an object recognition device configured to recognize a surrounding vehicle present around a host vehicle and to calculate a relative position of the surrounding vehicle and with a display device comprising a processor being configured to display information to be provided to an occupant of the host vehicle. The processor is configured to display the surrounding vehicle at the relative position calculated by the object recognition device along with the host vehicle, to display a mark showing that a lane change is planned to be performed at a planned space for performing a lane change in a destination driving lane when it is planned to perform an automatic lane change and to make the position of the mark change in accordance with the relative position of the surrounding vehicle when there is a surrounding vehicle present having an effect on the lane change at the destination driving lane.

Further, according to another aspect of the present disclosure, there is provided a display method for displaying information to be provided to an occupant of the vehicle on an information display screen, the display method comprising displaying a surrounding vehicle present around a vehicle together with that vehicle, displaying a mark showing that a lane change is planned to be performed at a predetermined space for performing a lane change in a destination driving lane which is a destination for a lane change when it is planned to perform an automatic lane change at that vehicle, and making the position of the mark change in accordance with a relative position of the surrounding vehicle with respect to that vehicle when there is a surrounding vehicle present having an effect on the lane change at the destination driving lane.

Further, according to another aspect of the present disclosure, there is provided a non-transitory computer storage medium containing a computer program for making a computer operate to display a surrounding vehicle present around a vehicle together with that vehicle on an information display screen of that vehicle, display a mark showing that a lane change is planned to be performed at a predetermined space for performing a lane change in a destination driving lane which is a destination for a lane change when it is planned to perform an automatic lane change at that vehicle, and make the position of the mark change in accordance with a relative position of the surrounding vehicle with respect to that vehicle when there is a surrounding vehicle present having an effect on the lane change at the destination driving lane.

According to these aspects of the present disclosure, it is possible to display a mark at a space planned for a lane change together with a surrounding vehicle and possible to make the position of the mark change over time in accordance with a relative position of the surrounding vehicle, so whether lane changes will be made or further to what position of the destination driving lane the lane change is going to be performed can be easily grasped by the driver.

DESCRIPTION OF EMBODIMENTS

Figure 1:
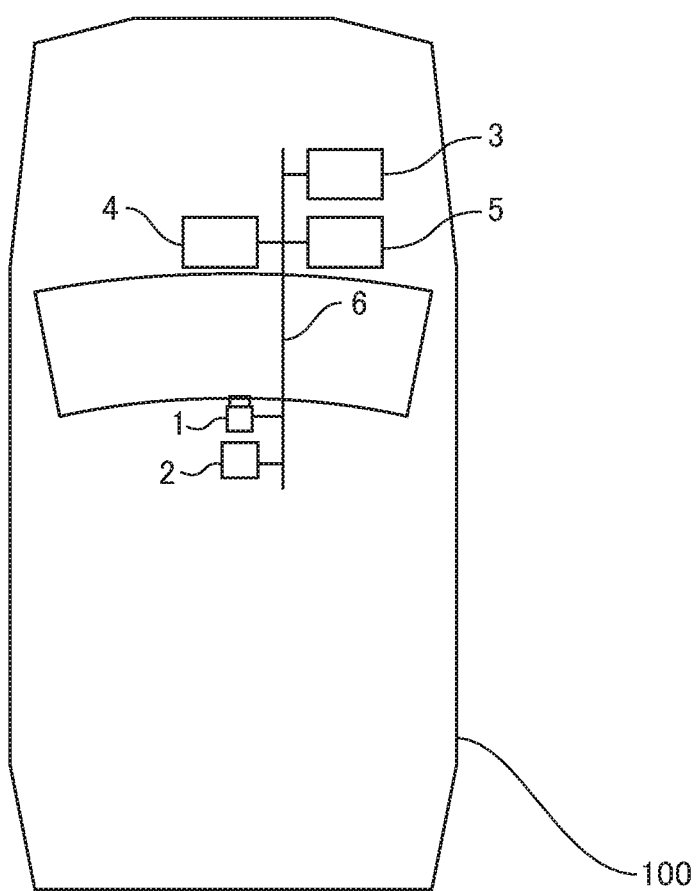
FIG. 1 is a general system diagram of a vehicle provided with a display device according to one embodiment of the present disclosure.

Below, referring to the drawings, an embodiment of the present disclosure will be explained in detail. Note that, in the following explanation, similar component elements are assigned the same reference notations.

FIG. 1 is a general system diagram of a vehicle 100 provided with a display device 4 according to one embodiment of the present disclosure.

The vehicle 100 is provided with a camera 1, distance measurement sensor 2, object recognition device 3, display device 4, and vehicle control device 5. The camera 1, distance measurement sensor 2, object recognition device 3, display device 4, and vehicle control device 5 are respectively connected to be able to communicate through an internal vehicle network 6 based on a standard called a "Controller Area Network".

The camera 1 is, for example, attached at the inside of the compartment of the vehicle 100 so as to face frontward from the vehicle 100, captures an image of the front region of the vehicle 100 by a predetermined frame rate (for example, 10 Hz to 40 Hz), and generates an image in which that front region is captured (below, referred to as the "camera image"). Further, the camera 1 sends the generated camera image through the internal vehicle network 6 to the vehicle control device 5 each time generating a camera image.

Figure 2:
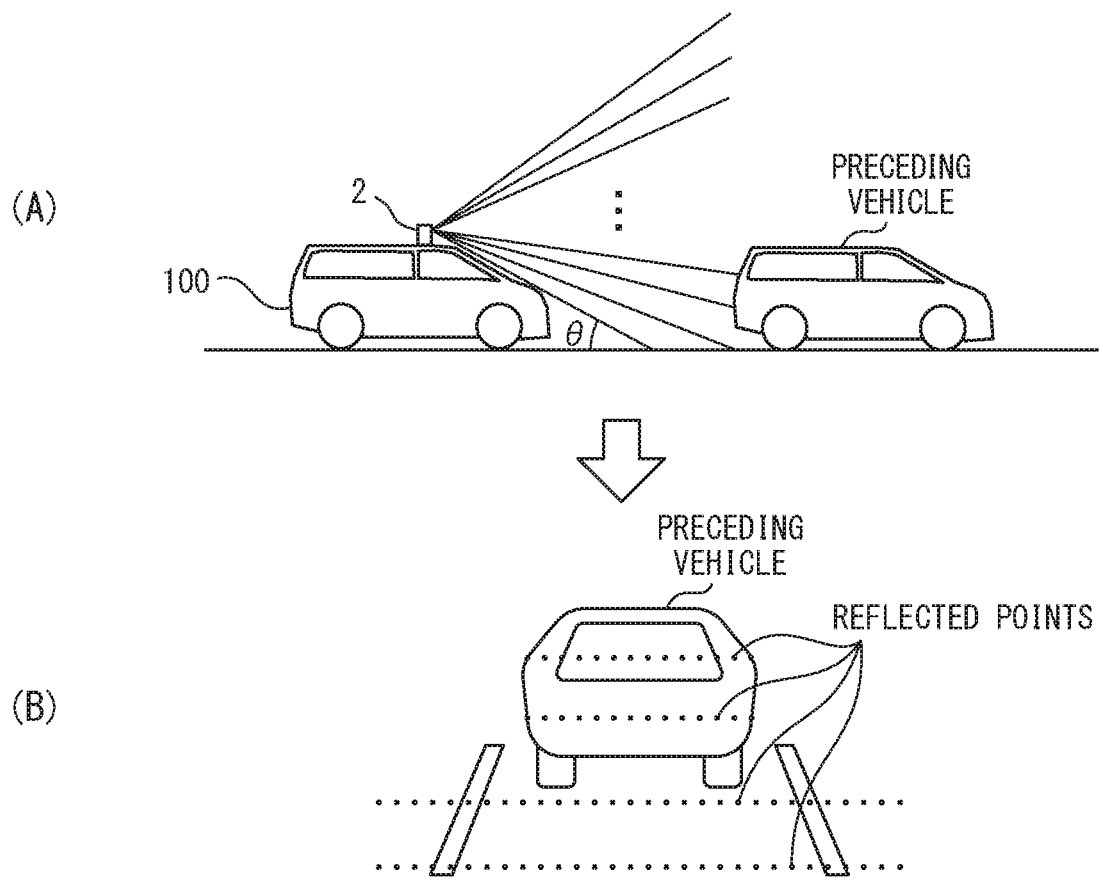
FIG. 2 is a view explaining operation of a distance measurement sensor.

The distance measurement sensor 2 emits a plurality of laser beams or radio waves made different in emission angle horizontally and in parallel such as shown in FIG. 2(A) at the distance measuring region around the vehicle 100 and receives the reflected light of the emitted laser beams or the reflected waves of the emitted radio waves. Further, the distance measurement sensor 2 measures the distance to the road or an obstacle present in the distance measurement region (for example, a building, a running vehicle such as a preceding vehicle or following vehicle on the road or oncoming vehicle, a stopped vehicle, a curb, fallen object, pedestrian, etc.) based on the received reflected light beams or reflected waves. The distance to the road or an obstacle, as shown in FIG. 2(B), is acquired for each reflected point of the laser beams or radio waves (fired points). The distance measurement sensor 2 links the distances to the individual reflected points and the coordinate information of the individual reflected points and sends this as distance measurement data through the internal vehicle network 6 to the object recognition device 3.

As the distance measurement sensor 2 emitting laser beams, for example, a LIDAR (light detection and ranging) device may be mentioned. Further, as the distance measurement sensor 2 firing radio waves, for example, a milliwave radar sensor may be mentioned. In the present embodiment, as shown in FIG. 2(A), a LIDAR attached to the roof of the vehicle 100 is used as the distance measurement sensor 2.

The object recognition device 3 recognizes a surrounding vehicle present around the vehicle 100 based on the distance measurement data and sends information related to the recognized surrounding vehicle (below, referred to as the "surrounding vehicle information") through the internal vehicle network 6 to the display device 4 and vehicle control device 5. Specifically, the object recognition device 3 recognizes a surrounding vehicle present around the vehicle 100 by grouping reflected points satisfying a predetermined condition among a plurality of reflected points detected based on the reflections of the fired laser beams etc. as reflected points of laser beams etc. reflected from the same object. Note that in the following explanation, to clearly differentiate the vehicle 100 and a surrounding vehicle present around the vehicle 100, in accordance with need, sometimes the vehicle 100 will be referred to as the "host vehicle 100".

Figure 3:
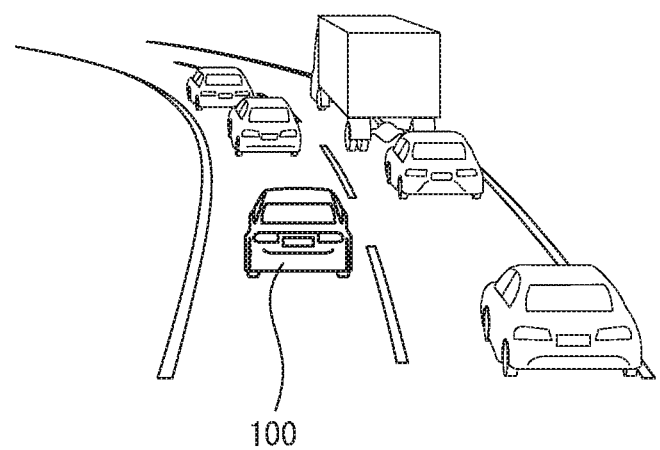
FIG. 3 is a view showing one example of a case of displaying surrounding vehicles present around a vehicle together with the vehicle on an information display screen.
Figure 4:
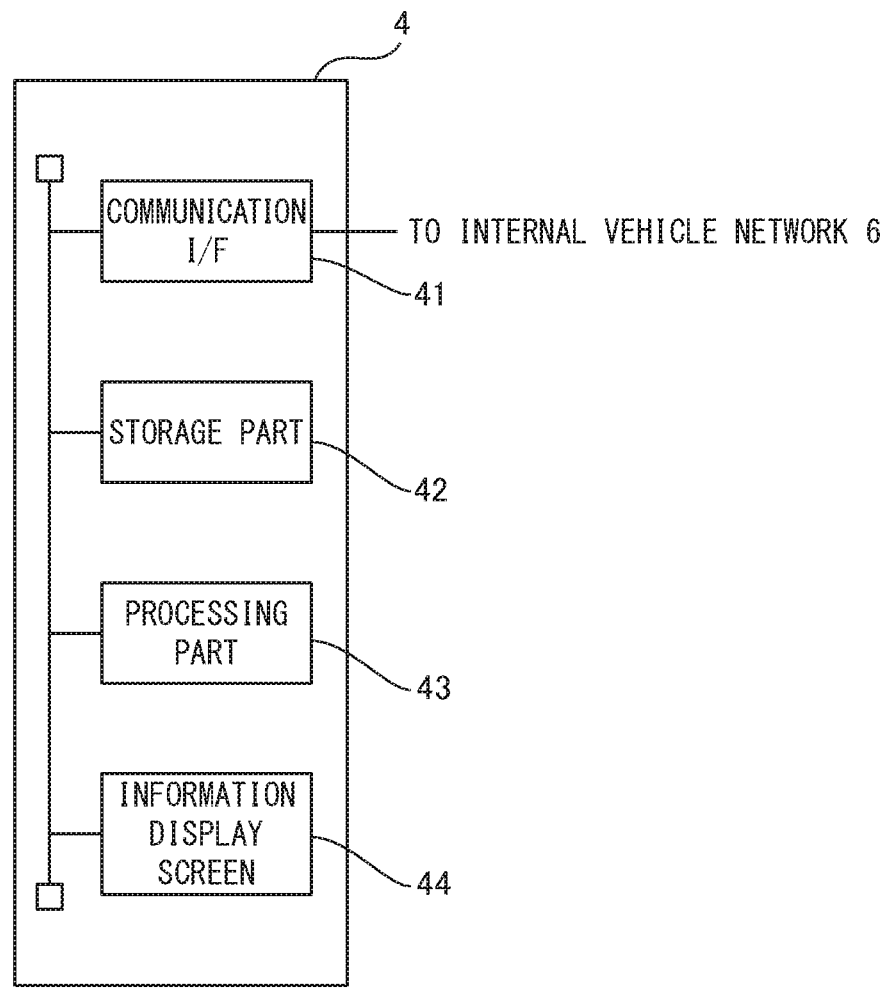
FIG. 4 is a view showing a hardware configuration of a display device according to one embodiment of the present disclosure.

The display device 4 is provided with an information display screen 44 arranged at a position which the driver of the vehicle 100 can see (see FIG. 4). The information display screen 44, for example, is a liquid crystal display or an organic EL display or other of various types of displays. In the surrounding vehicle information sent from the object recognition device 3, information on the type of each surrounding vehicle (passenger car, truck, motorcycle, etc.), information on the position of each surrounding vehicle in the case based on the vehicle 100 (relative position information) and preceding vehicle information relating to the presence of any surrounding vehicle running in front of the vehicle 100 and in the same lane as the vehicle 100 (below, referred to as a "preceding vehicle") or the following distance with that preceding vehicle, etc. are included. Based on this surrounding vehicle information, the display device 4 according to the present embodiment, for example, as shown in FIG. 3, displays any surrounding vehicle present around the vehicle 100 on the information display screen 44 together with the vehicle 100. Specifically, if the surrounding vehicle is a passenger car, the display device 4, as shown in FIG. 3, displays a predetermined passenger car icon at the relative position of that surrounding vehicle. Similarly, if the surrounding vehicle is a truck, the display device 4 displays a predetermined truck icon at the relative position of that surrounding vehicle and, while not shown, if the surrounding vehicle is a motorcycle, displays a predetermined motorcycle icon at the relative position of that surrounding vehicle.

At the vehicle control device 5, in addition to the above-mentioned camera image and surrounding vehicle information, various types of information required for driver assistance for automatically performing part or all of the driving operations relating to acceleration, steering, and braking (for example, information on the appearance of the driver, information on the current position of the vehicle 100, information on the vehicle speed, etc.) are input. Further, based on this information, the vehicle control device 5 prepares a driving plan of the vehicle 100 and automatically performs part or all of the driving operations relating to acceleration, steering, and braking in accordance with that driving plan. Further, in the present embodiment, the vehicle control device 5 sends the information relating to the prepared driving plan (below, referred to as the "driving plan information") through the internal vehicle network 6 to the display device 4.

FIG. 4 is a view showing the hardware configuration of the display device 4.

As shown in FIG. 4, the display device 4 is provided with a communication interface 41, storage part 42, processing part 43, and information display screen 44.

The communication interface 41 is provided with an interface circuit for connecting the display device 4 to the internal vehicle network 6. That is, the communication interface 41 is connected through the internal vehicle network 6 to the object recognition device 3. The communication interface 41 transfers the received surrounding vehicle information to the processing part 43 each time receiving surrounding vehicle information from the object recognition device 3.

The storage part 42 has an HDD (hard disk drive) or optical storage medium, semiconductor memory, or other storage medium and stores the various types of computer programs and data etc. used for processing at the processing part 43.

The processing part 43 has one or more processors and their peripheral circuits. The processing part 43 runs various types of computer programs stored in the storage part 42 and comprehensively controls the overall operation of the display device 4. For example, it is a CPU (central processing unit). Based on the surrounding vehicle information and driving plan information received through the communication interface 41, the processing part 43 performs display processing for displaying information relating to surrounding vehicles present around the vehicle 100 and lane changes and other various types of information on the information display screen 44. Details of this display processing will be explained later with reference to FIG. 5.

The information display screen 44, as explained above, is for example a liquid crystal display or organic EL display or other of various types of displays which is arranged at a position which the driver of the vehicle 100 can see and which displays information according to a signal output from the processing part 43 (for example, text information or graphic information).

Note that, the hardware configurations of the object recognition device 3 and vehicle control device 5 are not shown, but in the same way as the display device 4, they are provided with communication interfaces, storage parts, and processing parts.

Here, in the present embodiment, as shown in FIG. 3, a surrounding vehicle present around the host vehicle 100 grasped at the vehicle side, that is, a surrounding vehicle present around the host vehicle 100 recognized by the object recognition device 3, is made to be displayed by the display device 4 on the information display screen 44. In this way, by disclosing information grasped at the vehicle side to the driver during driver assistance by the vehicle control device 5, for example, the driver becomes able to judge whether the information which the vehicle side grasped etc. is accurate, so the driver can be made to feel safe.

On the other hand, during driver assistance by the vehicle control device 5, sometimes a lane change is automatically performed when passing, when merging, when branching off, etc., but if lane changes are to be performed or, further, it is unclear at what position of the destination driving lane a lane change is going to be made, in particular if there is a surrounding vehicle present around the host vehicle 100, the driver is liable to feel uneasy.

Therefore, in the present embodiment, when an automatic lane change is planned to be performed, a mark showing a lane change is planned to be performed (below, referred to as a "lane change mark") is made to be displayed at the information display screen 44 at a predetermined space for performing a lane change at the destination driving lane along with the host vehicle 100 and surrounding vehicle while changing its position and display mode over time.

Below, referring to FIG. 5 to FIG. 7, details of the display processing according to the present embodiment performed at the processing part 43 of the display device 4 will be explained.

Figure 5:
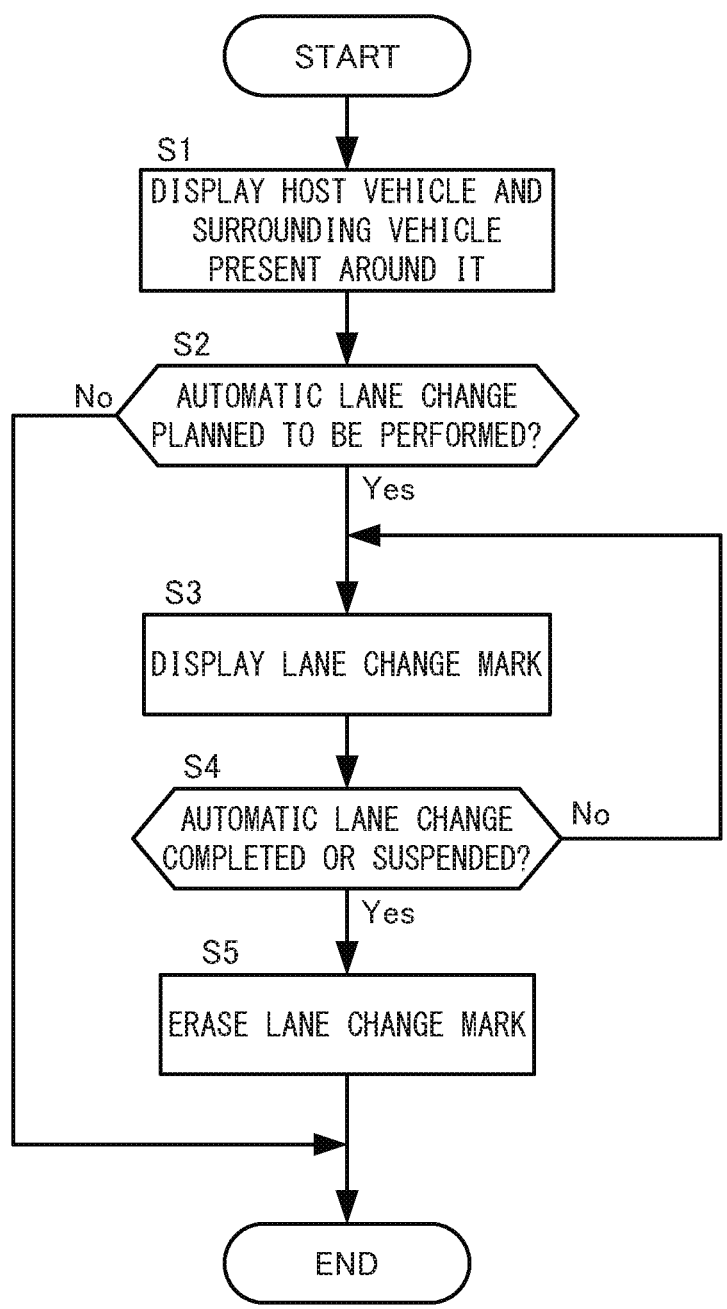
FIG. 5 is a flow chart explaining display processing according to one embodiment of the present disclosure.

FIG. 5 is a flow chart explaining details of the display processing according to the present embodiment.

At step S1, the display device 4 displays a surrounding vehicle present around the host vehicle 100 on the information display screen 44 together with the host vehicle 100 based on the surrounding vehicle information received from the object recognition device 3.

At step S2, the display device 4 judges if an automatic lane change is planned to be performed based on the driving plan information received from the vehicle control device 5. If an automatic lane change is planned to be performed, the display device 4 proceeds to the processing of step S3. On the other hand, if an automatic lane change is not planned to be performed, the display device 4 ends the present processing.

At step S3, the display device 4 displays a lane change mark at the information display screen 44 at a predetermined space for performing a lane change at the destination driving lane together with the host vehicle 100 and surrounding vehicle. For example, when there is any surrounding vehicle present having an effect on a lane change in the destination driving lane, the display device 4 displays the lane change mark on the information display screen 44 together with the host vehicle 100 and surrounding vehicle while making the position and display mode change over time in accordance with the relative position of that surrounding vehicle. The specific method of display of the lane change mark according to the present embodiment will be explained later referring to FIG. 6 and FIG. 7.

At step S4, based on the driving plan information received from the vehicle control device 5, the display device 4 judges whether the automatic lane change planned to be performed has been completed or whether it has been suspended for some reason or another. When the automatic lane change planned to be performed has been completed or has been suspended, the display device 4 proceeds to the processing of step S5. On the other hand, when the automatic lane change planned to be performed has still not been completed and further it has not been suspended, the display device 4 returns to the processing of step S3 and continues to display the lane change mark.

At step S5, the display device 4 erases the lane change mark from the information display screen 44.

Below, referring to FIG. 6 and FIG. 7, a specific method of display of a lane change mark according to the present embodiment will be explained.

Figure 6:
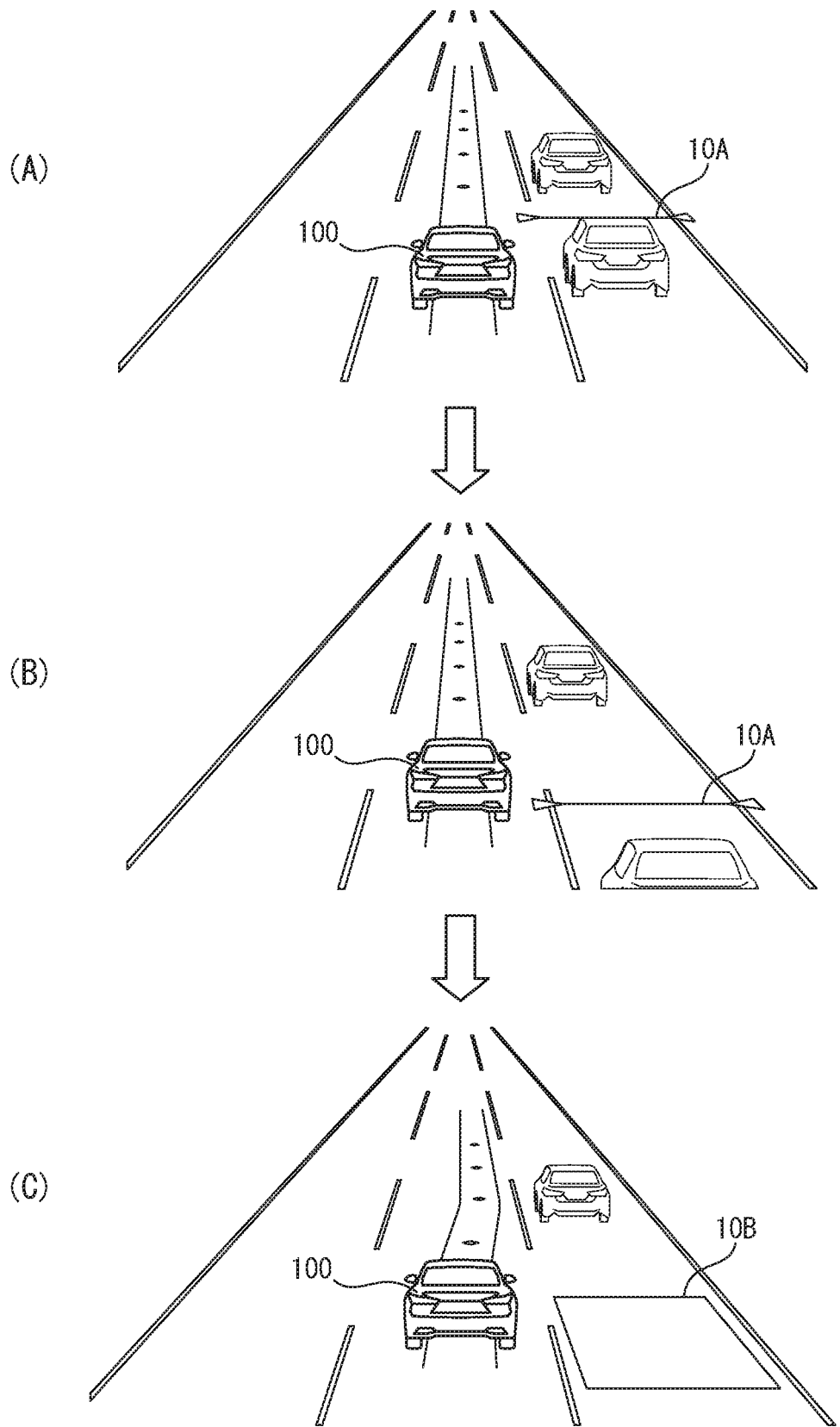
FIGS. 6A-6C is a view explaining a specific method of display of a lane change mark.

FIG. 6 is a view showing the state of change along with time of a lane change mark if there is a surrounding vehicle having an effect on a lane change in the destination driving lane present in the range of display of the information display screen 44.

As shown in FIG. 6(A) and FIG. 6(B), when an automatic lane change is planned to be performed and the host vehicle 100 is in a state waiting for the lane change to be performed, a line mark 10A is displayed as the lane change mark at the destination driving lane.

The line mark 10A is displayed at a predetermined space for performing the lane change in the destination driving lane. The space where the line mark 10A is displayed is made a space behind a surrounding vehicle when there is a surrounding vehicle present in the range of display of the information display screen 44. Due to this, behind which surrounding vehicle a lane change is planned to be performed is made easy for the driver to judge.

In the example shown in FIG. 6, as shown in FIG. 6(A), the line mark 10A is first displayed in a space sandwiched between two surrounding vehicles at the right diagonal front of the host vehicle 100. After that, the speed of the host vehicle 100 is controlled to change lanes to the space where the line mark 10A is displayed and the position of the line mark 10A gradually changes along with the change in the relative position with the two surrounding vehicles along with the elapse of time. Further, as shown in FIG. 6(B), a lane change is performed if the line mark 10A is displayed right at the side of the host vehicle 100.

By displaying a lane change mark at a predetermined space for performing a lane change together with the surrounding vehicle in this way and making the position of the lane change mark change over time in accordance with the relative position of the surrounding vehicle, when lane changes will be performed and further to what position of the destination driving lane a lane change is going to be performed can be easily grasped by the driver.

Note that, in the present embodiment, in actually performing a lane change, if space enabling a lane change is sufficiently secured and the situation becomes one where a lane change is possible, as shown in FIG. 6(C), the fact of a lane change being actually performed is transmitted to the driver by making the line mark 10A which had been displayed right at the side of the host vehicle 100 change to a planar mark 10B.

In this way, by making the display mode of the lane change mark change between when waiting to perform a lane change and when actually performing a lane change, it is possible to clarify more whether lane changes will be made. Further, if unable to obtain a grasp as to if the vehicle is in a state waiting for a lane change or if a lane change is going to be performed from then on, the driver would find it difficult to judge if he or she should override the lane change, but by changing the display mode of the lane change mode, if the vehicle is in a state waiting for a lane change or if a lane change is going to be performed from then on becomes able to be easily grasped by the driver and he or she can override it in accordance with need.

Note that, in the present embodiment, when there is no surrounding vehicle present having an effect on a lane change in the destination driving lane, the line mark 10A is displayed right at the side of the host vehicle 100, then is immediately made to change to the planar mark 10B whereupon the lane change is performed, but the planar mark 10B may also be made to be displayed from the start without displaying the line mark 10A.

Further, in the present embodiment, the lane change mark for when waiting to perform a lane change is made the line mark 10A and the lane change mark when actually performing a lane change is made the planar mark 10B, but the modes of display of the lane change marks are not particularly limited.

Figure 7:
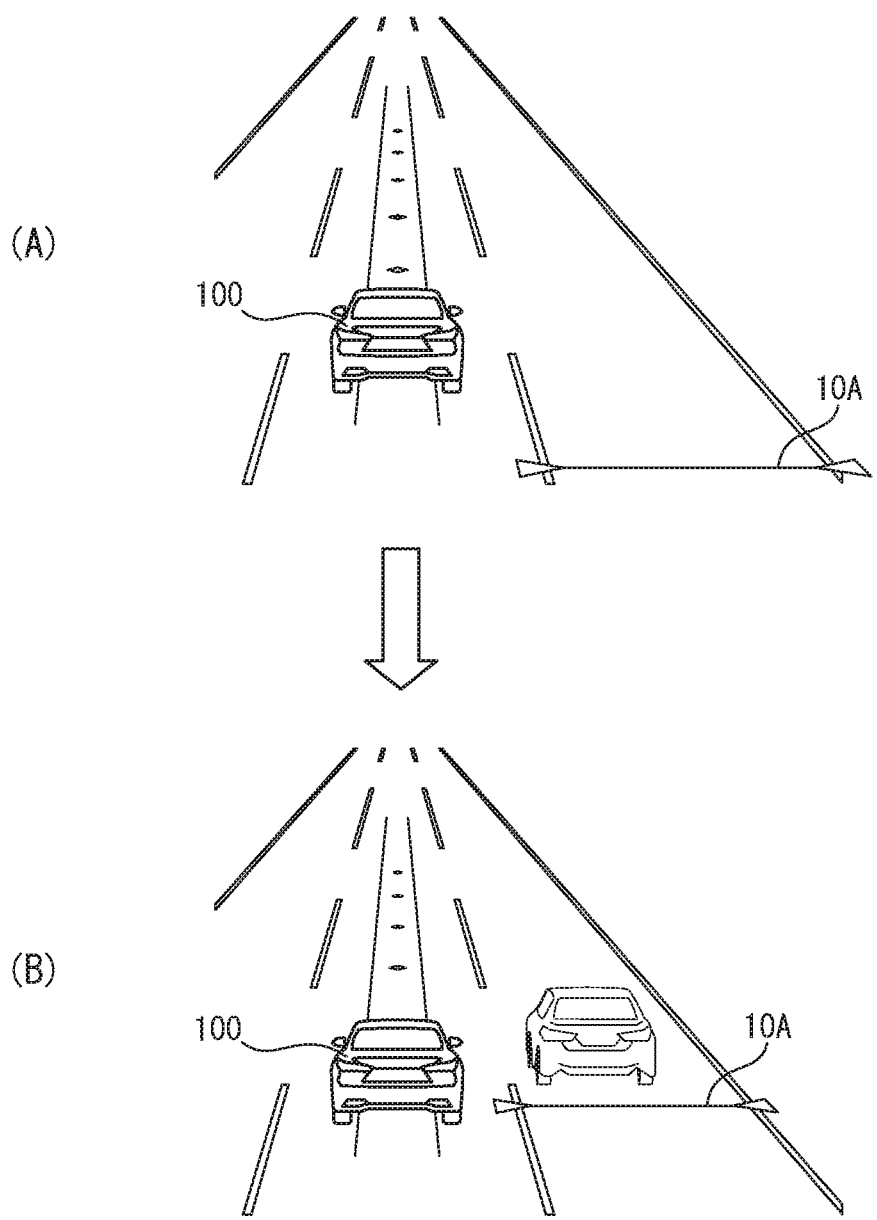
FIGS. 7A-7B is a view explaining a specific method of display of a lane change mark.

FIG. 7 is a view showing the state of change along with time of a lane change mark in the case where a surrounding vehicle having an effect on a lane change in the destination driving lane is running behind the host vehicle 100 and is present outside the range of display of the information display screen 44.

If the relative speed of a surrounding vehicle running in the destination driving lane behind the host vehicle 100 is fast, sometimes a driving plan is prepared calling for performing the lane change behind the surrounding vehicle after that surrounding vehicle passes the host vehicle 100. If such a driving plan is prepared, the predetermined space for performing a lane change becomes a space behind the surrounding vehicle running in the destination driving lane far behind the host vehicle 100, but there are limits to the range of display of the information display screen 44, so it is difficult to display a surrounding vehicle running in the destination driving lane far behind the host vehicle 100 at the information display screen 44. For this reason, if such a driving plan is prepared, how to transmit to the driver the fact that the host vehicle 100 is in a state waiting for a lane change becomes a problem.

Therefore, in the present embodiment, when such a driving plan is prepared, that is, when there is a surrounding vehicle present having an effect on the lane change in the destination driving lane and that surrounding vehicle is present behind the host vehicle 100 and not present in the range of display of the information display screen 44, as shown in FIG. 7(A), the line mark 10A used as the lane change mark is made to be displayed at the back end of the destination driving lane.

Further, as shown in FIG. 7(B), after the surrounding vehicle becomes present in the range of display of the information display screen 44, the line mark 10A is displayed at a space behind that surrounding vehicle while the position of the line mark 10A is made to gradually move forward matching the change of the relative position of that surrounding vehicle.

Due to this, in changing lanes, the fact that the state is one of waiting for a surrounding vehicle running in the destination driving lane far behind the host vehicle 100 to pass can be easily grasped by the driver.

According to the present embodiment explained above, a vehicle 100 able to automatically change lanes is provided with an object recognition device 3 configured to recognize a surrounding vehicle present around that vehicle 100 and to calculate a relative position of that surrounding vehicle and with a display device 4 comprising a processor being configured to display information to be provided to an occupant of that vehicle 100. Further, the processor of the display device 4 is configured to display the surrounding vehicle at the relative position calculated by the object recognition device 3 along with the vehicle 100, to display a lane change mark showing that a lane change is planned to be performed at a predetermined space for performing a lane change in a destination driving lane which is a destination for a lane change when it is planned to perform an automatic lane change, and to make the position of the lane change mark change in accordance with the relative position of the surrounding vehicle when there is a surrounding vehicle present having an effect on the lane change at the destination driving lane. Specifically, the processor of the display device 4 is configured so that when there is a surrounding vehicle present having an effect on the lane change at the destination driving lane and that surrounding vehicle is present in the range of display of the information display screen 44 of the display device 4, the predetermined space for performing a lane change is made a space behind the surrounding vehicle.

In this way, by displaying a mark at a predetermined space for performing a lane change together with a surrounding vehicle and making the position of that mark change over time in accordance with the relative position of the surrounding vehicle, whether lane changes will be made or further to what position of the destination driving lane the lane change is going to be performed can be easily grasped by the driver.

Further, the processor of the display device 4 according to the present embodiment is further configured so that when there is a surrounding vehicle present having an influence on a lane change in the destination driving lane, but that surrounding vehicle is present behind the host vehicle 100 and is not present in the range of display of the information display screen 44 of the display device 4, it displays a lane change mark at the back end of the destination driving lane.

Due to this, in changing lanes, the fact that the state is one of waiting for a surrounding vehicle running in the destination driving lane far behind the host vehicle 100 to pass can be easily grasped by the driver.

Further, the processor of the display device 4 according to the present embodiment is further configured so as to make the display mode of the lane change mark change between when waiting to perform a lane change and when actually performing a lane change.

If unable to obtain a grasp of the vehicle being in a state waiting for a lane change or the vehicle going to perform a lane change from then on, the driver would find it difficult to judge whether to override the lane change, but by making the display mode of the lane change mark change, whether the vehicle is in a state waiting for a lane change or if the vehicle is going to perform a lane change from then on can be easily grasped by the driver and the lane change can be overridden as required.

Above, an embodiment of the present disclosure was explained, but the above embodiment only shows some of the examples of application of the present disclosure. It is not intended to limit the technical scope of the present disclosure to the specific configuration of the embodiment.

For example, if viewing the above embodiment from another perspective, the above embodiment can be grasped as a display method for displaying information to be provided to an occupant of the vehicle 100 on an information display screen 44, the display method comprising displaying a surrounding vehicle present around a vehicle 100 together with that vehicle 100, displaying a mark showing that a lane change is planned to be performed at a predetermined space for performing a lane change in a destination driving lane which is a destination for a lane change when it is planned to perform an automatic lane change at that vehicle 100, and making the position of the mark change in accordance with a relative position of the surrounding vehicle with respect to that vehicle 100 when there is a surrounding vehicle present having an effect on the lane change at the destination driving lane.

Similarly, the above embodiment can also be grasped as a non-transitory computer storage medium containing a computer program for making a computer (processing part 43) operate to display a surrounding vehicle present around a vehicle 100 together with that vehicle 100, display a mark showing that a lane change is planned to be performed at a predetermined space for performing a lane change in a destination driving lane which is a destination for a lane change when it is planned to perform an automatic lane change at that vehicle 100, and make the position of the mark change in accordance with a relative position of the surrounding vehicle with respect to that vehicle 100 when there is a surrounding vehicle present having an effect on the lane change at the destination driving lane.

The invention claimed is:

1. A host vehicle configured to be able to automatically change lanes, the host vehicle comprising:
   an object recognition device, comprising a first processor, configured to:
      recognize a surrounding vehicle present around the host vehicle; and
      calculate a relative position of the surrounding vehicle with respect to the host vehicle; and
   a display device, comprising a second processor, configured to display information to be provided to an occupant of the host vehicle,
   wherein the display device is further configured to:
      display the surrounding vehicle at the relative position calculated by the object recognition device along with the host vehicle;
      display a mark, at a side of the host vehicle, showing that a lane change is planned to be performed at a predetermined space in a destination driving lane and that the surrounding vehicle is having an effect on the lane change at the destination driving lane, the destination driving lane being a destination of the lane change that is planned to be performed by the host vehicle;
      make a position of the mark change in accordance with the relative position of the surrounding vehicle with respect to the host vehicle when the surrounding vehicle is having the effect on the lane change at the destination driving lane, and
      when the surrounding vehicle is having the effect on the lane change in the destination driving lane, and the surrounding vehicle is located behind a rear end of the host vehicle outside of a range of display of the display device, display the mark aligned with the rear end of the host vehicle and superimposed on the destination driving lane.

2. The host vehicle according to claim 1, wherein the display device is further configured to:
   when the surrounding vehicle is having the effect on the lane change in the destination driving lane and the surrounding vehicle is present in the range of display of the display device, the display device makes the predetermined space a space behind the surrounding vehicle.

3. The host vehicle according to claim 1, wherein the display device is further configured to:
   display the mark in a first display mode, when waiting to perform the lane change; and
   display the mark in a second display mode, when performing the lane change,
   wherein the first display mode is different from the second display mode.

4. A display method for displaying information to be provided to an occupant of a host vehicle on an information display screen, the display method comprising:
   displaying a surrounding vehicle present around the host vehicle together with the host vehicle,
   displaying a mark, at a side of the host vehicle, showing that a lane change is planned to be performed at a predetermined space in a destination driving lane and that the surrounding vehicle is having an effect on the lane change at the destination driving lane, the destination driving lane being a destination of the lane change that is planned to be performed by the host vehicle,
   making a position of the mark change in accordance with a relative position of the surrounding vehicle with respect to the host vehicle when the surrounding vehicle is having the effect on the lane change at the destination driving lane, and
   when the surrounding vehicle is having the effect on the lane change in the destination driving lane, and the surrounding vehicle is located behind a rear end of the host vehicle outside of a range of display of the information display screen, displaying the mark aligned with the rear end of the host vehicle and superimposed on the destination driving lane.

5. A non-transitory computer storage medium storing a computer-executable program for displaying information to be provided to an occupant of a host vehicle, that when executed by at least one processor of the host vehicle, causes the host vehicle to:
   display a surrounding vehicle present around the host vehicle together with the host vehicle on an information display screen of the host vehicle,
   display a mark, at a side of the host vehicle, showing that a lane change is planned to be performed at a predetermined space in a destination driving lane and that the surrounding vehicle is having an effect on the lane change at the destination driving lane, the destination driving lane being a destination of the lane change that is planned to be performed by the host vehicle,
   make a position of the mark change in accordance with a relative position of the surrounding vehicle with respect to the host vehicle when the surrounding vehicle is having the effect on the lane change at the destination driving lane, and
   when the surrounding vehicle is having the effect on the lane change in the destination driving lane, and the surrounding vehicle is located behind a rear end of the host vehicle outside of a range of display of the information display screen, display the mark aligned with the rear end of the host vehicle and superimposed on the destination driving lane.

* * * * *